(12) United States Patent
Susairaj et al.

(10) Patent No.: US 8,032,548 B2
(45) Date of Patent: Oct. 4, 2011

(54) EFFICIENT NETWORK DATA TRANSFER

(75) Inventors: Margaret Susairaj, Sunnyvale, CA (US); Sumanta Chatterjee, Fremont, CA (US); Ashok Joshi, Westborough, MA (US)

(73) Assignee: Oracle International Corporation, Redwood Shores, CA (US)

( * ) Notice: Subject to any disclaimer, the term of this patent is extended or adjusted under 35 U.S.C. 154(b) by 592 days.

(21) Appl. No.: 11/831,809

(22) Filed: Jul. 31, 2007

(65) Prior Publication Data

US 2009/0037424 A1   Feb. 5, 2009

(51) Int. Cl.
*G06F 17/30* (2006.01)
*G06F 12/00* (2006.01)
*G06F 15/16* (2006.01)

(52) U.S. Cl. ......... 707/770; 707/783; 707/825; 709/217

(58) Field of Classification Search ............ 707/10, 707/781, 783, 769, 825, 2, 999.01, 999.002, 707/770; 709/219, 202, 217
See application file for complete search history.

(56) References Cited

U.S. PATENT DOCUMENTS

| | | | |
|---|---|---|---|
| 5,812,840 A | 9/1998 | Shwartz | |
| 6,192,370 B1 | 2/2001 | Primsch | |
| 7,287,034 B2 | 10/2007 | Wong et al. | |
| 7,461,053 B2 | 12/2008 | Trappen et al. | |
| 2003/0004952 A1* | 1/2003 | Nixon et al. | 707/10 |
| 2003/0229625 A1 | 12/2003 | Melchior et al. | |
| 2005/0055381 A1 | 3/2005 | Ganesh et al. | |
| 2005/0203962 A1 | 9/2005 | Zhou et al. | |
| 2006/0242104 A1 | 10/2006 | Ellis et al. | |
| 2008/0281846 A1 | 11/2008 | Hoang et al. | |
| 2010/0125598 A1* | 5/2010 | Lango et al. | 707/769 |

OTHER PUBLICATIONS

Disclosure for U.S. Appl. No. 11/831,930, filed May 11, 2007, notice of publication correspondence Nov. 13, 2008.*
U.S. Appl. No. 11/801,930, Notice of Allowance correspondence dated Mar. 29, 2010.*
U.S. Appl. No. 11/801,930, Final Office Action correspondence dated Dec. 8, 2009.*
U.S. Appl. No. 11/801,930, filed May 11, 2007, Notice Of Publication, filed Nov. 13, 2008.
U.S. Appl. No. 11/801,930, filed May 11, 2007, Advisory Action, Feb. 23, 2010.

* cited by examiner

*Primary Examiner* — James Trujillo
*Assistant Examiner* — Bruce Moser
(74) *Attorney, Agent, or Firm* — Hickman Palermo Truong & Becker LLP (57) ABSTRACT

An approach for providing efficient network data transfer service is provided. In one embodiment, a first database server receives, from a second database server, a first request to access a first storage subsystem. Here, the second database server cannot access first data in the first storage subsystem without another database server transmitting the first data to the second database server. In response, the first database server provides the second database server a first set of access primitives. Using the first set of access primitives, the second database server may access data stored in the first storage subsystem that may be otherwise not accessible. As a result, the first database server receives, from the second database server, a first data access request to access first data stored in the first storage subsystem.

22 Claims, 6 Drawing Sheets

500 a first database server receiving, from a second database server, a first request to access a first disk storage device, wherein the second database server cannot access first data in the first disk storage device 510

↓ the first database server providing the second database server a first set of access primitives 520

↓ the first database server receiving, from a second database server, a data access request to access data stored in the first disk storage device 530

EFFICIENT NETWORK DATA TRANSFER

FIELD OF THE INVENTION

The present invention relates to database systems and, more specifically, distributed database systems that support efficient data transfer across their component database systems.

BACKGROUND

Some organizations may install database servers in several locations that are geographically diverse from each other. For example, a corporation may set up two database servers in two locations (such as New York City and Los Angeles) so that they operate in an autonomous and load-balanced way in a normal situation, but, in case a disaster (such as earthquakes, hurricanes, or terrorist attacks) causes one server to fail, the other server can quickly take over and keep critical functions and services, some of which might have been previously supported by the failed server, uninterrupted. Typically, under such a multi-location scheme, a database server at a location has its own storage subsystem; direct access to such a storage subsystem is not shared with database servers at other locations; and only logical access to data stored in the storage subsystem is allowed to the database servers at the other locations. To provide logical access to data stored in the storage subsystem, copies of files or tables may be provided by the database server that owns the storage subsystem to the database servers in the other locations using file transfer protocols.

In addition to being highly inefficient, these techniques dictate uses of disparate methods to access local and remote data, respectively. As a result, a database server must use disparate calls, APIs and logic flows in handling accesses to the local data and remote data, thereby resulting in much programmatic complexity.

Under some other techniques, a local data storage device may be explicitly exported by its hosting operating system to a remote node that hosts a remote database server. For example, a hard disk that is directly attached to a hosting UNIX system may be explicitly exported by the hosting UNIX system. A remote node that has an appropriate communication link with the hosting UNIX system may mount the exported hard disk on the remote node, using an NFS protocol, thereby enabling remote access to the exported hard disk. However, there may be no direct link between a system that hosts local data storage devices and a remote node. For example, where a Network Attached Storage (NAS) system is used, a local database server that controls direct access to the NAS system may not be the same system as the NAS system itself. The NAS system that hosts the data storage devices may not have any communication link with the remote database server that enables the NFS protocol. Or, for any such reasons as site security, the NAS system may not be configured for exporting through external protocols such as the NFS protocol to any other database servers except the one directly attached.

Therefore, a better mechanism, which would better support network data transfer in distributed database systems, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of various embodiments of the invention. It will be apparent, however, that the present invention may be practiced without these specific details. In other instances, well-known structures and devices are shown in block diagram form in order to avoid unnecessarily obscuring the present invention.

Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

In accordance with some embodiments of the present description, two or more database servers may be related but separate from one another. In particular, the related database servers may be located in places geographically apart and communicatively linked through a network connection. Most of the database accesses required by database clients of any of the database servers can be satisfied locally by that database server. Occasionally, however, there may be a need for one of the related database servers to access another of the related database servers.

Since the related database servers are autonomous in most of their operations, there may be storage subsystems that are local to a specific database server (of the related database servers). In particular, it is not always possible to have any direct communication link between such storage subsystems and other database servers. Under these circumstances, it may not be feasible and/or advisable to have the storage subsystems to be exported to the other database servers using general networking protocols such as Network File System (NFS) protocol.

In accordance with some embodiments of this description, an efficient network data transfer service is provided between two database servers, say a remote database server and a local database server. Through this efficient network data transfer service, a full-fledged database access with respect to otherwise non-accessible locally attached (including network attached) storage subsystems may be provided to the database servers. For example, through this service, the remote database server may be offered to use a set of access primitives to access objects in the local database server. The objects to be (directly) accessed by the remote database server may include, but are not limited to, program objects and data objects. In particular, data block level access may be offered to the remote database server relative to any otherwise non-accessible storage subsystem that is attached to the local database server. A data block is an atomic unit of storage space allocated to store one or more database records (e.g., rows). Typically, a database system is configured to read and write database records from persistent storage and volatile memory in units no smaller than data blocks. When a record from a data block needs to be retrieved, the entire data block is read into an in-memory buffer the database system uses to temporarily store data blocks. Data blocks may also have headers and/or other data structures that describe information about the data block and/or records.

Using the set of access primitives, the remote database server may offer an I/O model to database clients associated with the remote database server. Under this I/O model, any such database client, associated with the remote database server, may use the same application programming interfaces to access data in the otherwise non-accessible storage subsystem in the local database server as with those to access data in storage subsystems in the remote database server itself. In other words, the database client does not need to know where the data is physically.

In some embodiments, the efficient network data transfer service does not communicate with external kernel processes or other operating system processes. Instead, the service makes use of a message pipe between the remote database server and the local database server that is established specifically for inter-database server communication. Since the database servers are related (for example, maybe offered by the same vendor), the message pipe is platform-independent in some embodiments. Even though the remote database server may be deployed on a personal computer while the local database server may be deployed on a workstation that runs an entirely different operating system than that of the personal computer, the database servers can still rely on the message pipe to provide the efficient network data transfer service.

Example System

Figure 1:
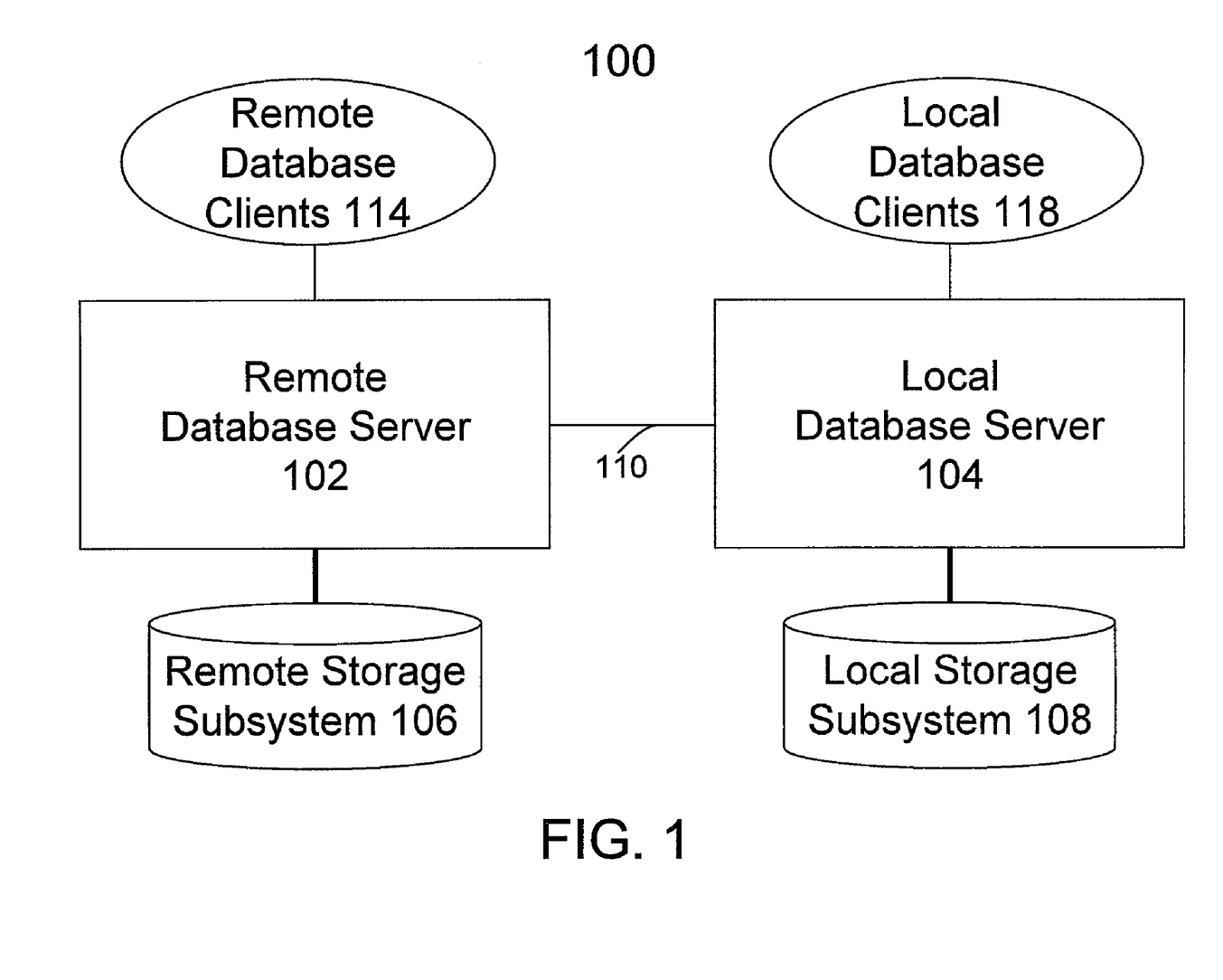
FIG. 1 is a block diagram of an example distributed database system in accordance with an embodiment of the present invention.

FIG. 1 illustrates an example (distributed database) system 100 that comprises a remote database server 102 and a local database server 104, in accordance with an embodiment of this description. For the purpose of this invention, the system (100) may be of any system that comprises multiple database servers that have dedicated (for example, a share-nothing type of) storage subsystems. As illustrated, a storage subsystem 106 is directly accessible only to remote database server 102 in system 100. Similarly, a storage subsystem 108 is directly accessible only to local database server 104 in system 100. Therefore, even though remote and local database servers 102 and 104 are communicatively coupled through a message pipe 110, local database server 104 cannot access storage subsystem 106. Retrieving data from access storage subsystem 106 requires participation of remote database server 106 in some form to furnish the data (via the access primitives or submission of queries). Similarly, remote database server 102 cannot access storage subsystem 108. For the purpose of this description, message pipe 110 may be enabled through a dedicated link, a local area network (LAN) or a wide area network (WAN), the Internet, an intranet, or a combination thereof.

In some embodiments, any of the storage subsystems (106 and 108) may be a NAS system. Such a NAS system may be specifically configured to be accessible only by some or all of nodes a single database server.

In some embodiments, any of the storage subsystems (106 and 108) may be a directly attached storage device to a database server. In these embodiments, the directly attached storage device may be specifically configured to be accessible only by some or all of nodes in a single database server.

As used herein, the terms "remote" and "local" may be used in a relative sense for illustration purposes only. For example, the remote database server (102) may be local to the remote clients (114) and the remote storage subsystem (106), but remote to the local clients (118) and the local storage subsystem (108). Likewise, the local database server (104) may be local to the local clients (118) and the local storage subsystem (108), but remote to the remote clients (114) and the remote storage subsystem (106).

In some embodiments, a database server in system 100 may be a single node database server, or a multi-instance database server that share access to storage subsystems among two or more database instances. Furthermore, nodes in a database server may run any type of operating system including those types that are capable of exporting storage devices through operating system services or through network-level protocols, and those types that are not capable of the aforementioned exporting.

Computing devices that are used to implement database servers may vary from server to server and even within the same server (cluster). For example, a database server in system 100 may run on a personal computer in an embodiment. A database server in system 100 may run on a UNIX server in another embodiment. Multiple instances within the same server (cluster) may run the same operating system or, alternatively, different operating systems. The computing devices may run the same operating system, different operating systems, or different releases of the same operating system in various embodiments.

In some example embodiments, the remote database server (102) and the local database server (104), as illustrated in FIG. 1, may be autonomous to each other, at least in normal operating circumstances. As used herein, the term "autonomous" means that the database servers are attached with dedicated storage subsystems only directly accessible to the attached database servers, that the servers may not be part of the same integrated system, and that the database servers may support their own database clients and applications. The dedicated storage subsystems, as noted before, may be only directly accessible to their owner-database servers.

Access Primitives

In some embodiments, the remote database server and the local database server are database systems developed by the same vendor (such as database systems developed and provided commercially by Oracle Corporation, Redwood Shore, Calif.). In some embodiments, a database server such as 102 and 104 may support at least one set of access primitives (or at least one set of database opcodes). In some embodiments, such a database server may support more than one set of access primitives concurrently. As a result, in some embodiments, the remote database server and the local database server may share one or more common sets of access primitives. Each set in the one or more sets of access primitives may correspond to a particular release of database systems and can be invoked by the database servers to implement full-fledged database services to be provided to database clients. Concurrent support by a database server for multiple sets of access primitives translates to concurrent support by the database server for multiple releases of database systems.

In some embodiments, access primitives or opcodes provide database system processes (resident in a database server) native access to program and data objects associated with the database server. As used herein, the term "native access" means access enabled by the access primitives to these program and data objects can be made without further use of a translation entity. For example, in situations where non-native access is provided (for example, in the case of ODBC, JDBC, etc.), users or user processes supply parameters and input data when invoking database access service from a database server. However, such non-native access requires a translation layer or function that translates the user-supplied parameters, data, computer language statements etc. into internal format used by the database server. In addition, such non-native access only allows direct access to schema objects (such as a SQL table, a view, etc.), and does not provide direct access to non-schema objects (such as a data block that makes up a SQL table, an index, etc.). On the other hand, when an access primitive is invoked to provide native access to program and data objects of a database server, access to these objects can be made without any further translation, as long as correct end point information is provided at the time of invocation. Furthermore, any of the program and data objects natively (and/or directly) accessed by an access primitive may be non-schema objects.

Through access primitives, a database server may natively access (for example, lock, unlock, read, write, modify, etc.) data at a data block level, an extent level or a segment level in another database server or an otherwise non-accessible storage subsystem attached to such another database server. For example, an access primitive that reads a data block at a location "data_block_loc" using an access mode of "read_access_mode" may take the form of _native_read(data_block_loc, read_access_mode). In a similar manner, through access primitives, a database server may natively access indexes, keys populating indexes, etc. In addition, through access primitives, a database server may natively access database schema, constraints, triggers, stored procedures, execution plans, statistics, etc. in another database server or an otherwise non-accessible storage subsystem attached to such another database server. Such access may involve both data_definition-language types of operations (such as creating a table, index, etc.) and data_manipulation-language types of operations (such as inserting, deleting, updating data, etc.). Furthermore, through access primitives, a database server may natively access services by program objects such as transaction manager, log writer, optimization engine, parallelization processes, etc. in another database server.

Message Pipe Between Database Servers

Figure 2:
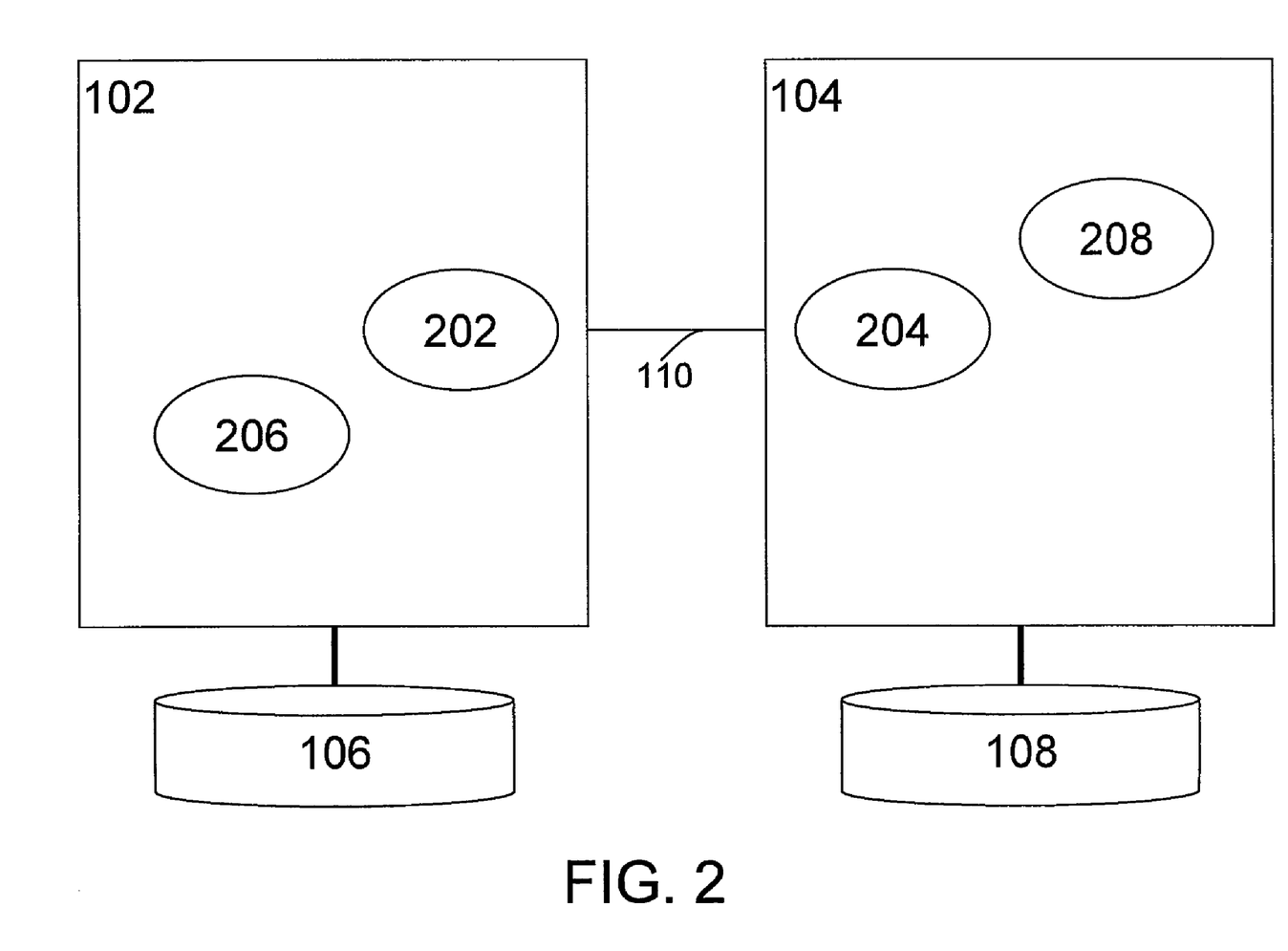
FIG. 2 is a diagram illustrating example database servers in accordance with an embodiment of the present invention.

As illustrated in FIG. 2, the message pipe (110) between the remote database server (102) and the local server (104) allows an entity in one of the two database servers to send messages to, and receive messages from, another entity in the other database server, in accordance with some embodiments of the present description.

In some embodiments, the message pipe (110) is established, on top of a TCP or UDP transport layer, between a message dispatcher process (202) in the remote database server (102) and a (corresponding) message dispatcher process (204) in the local database server (104). In some embodiments, the message dispatcher processes (202 and 204) and the message pipe (104) in between do not interact with any other services that are built on top of the TCP or UDP transport layer. For example, the message dispatcher processes (202 and 204) and the message pipe (104) between the two may neither interact nor rely on any such services (NFS, FTP, etc.) that are built on top of the TCP or UDP transport layer.

In these embodiments, the message pipe is dedicated to carrying database specific communications between endpoints (for example, an endpoint 206) in the remote database server (102) and endpoints (for example, an endpoint 208) in the local database server (104). The message dispatchers (202 and 204) may create a logical communication channel for the efficient network data transfer service in an embodiment. Thus, in such an embodiment, when remote database server 102 and local database server 104 are engaged in providing the efficient network data transfer service for database clients, the messages between the database servers (102 and 104) may be transferred using the logical communication channel. In an alternative embodiment, the message dispatcher (202 and 204) may transfer all database-related messages (not just those related to the efficient network data transfer service) between the database servers in the same overall communication channel.

Messages carried by the message pipe (110) and formats used by these messages may be specific to the database servers (102 and 104) implemented (for example, by the vendor that supplies database systems). The messages may carry message control information as well as service specific information.

The message pipe (110) may be established by prior configuration and provision. As used herein, the term "by prior configuration and provision" means that the message pipe is set up before, for example, an endpoint (e.g., 206) may make requests to communicate with another end point (e.g., 208) over the message pipe (110). In some embodiments, the message pipe (110) may also be established on-demand. That is, the message pipe (110) may be established when a database server (e.g., 102) first receives a request to communicate with the other database server (i.e., 104). For example, a database client at the remote database server may make a request for data that needs to be satisfied by the local database server. If, at the time of this request, a message pipe has not yet been established, the remote database server (e.g., 102) that handles the request may first cause the remote database server (102) to establish the message pipe (110) before sending the database client's request to the appropriate endpoint (e.g., 208) in the local database server (104).

In some embodiments, sufficient network configuration information (for example, IP address, port, mode, etc) for establishing the message pipe (110) may be stored in a persistent form on one or both of the database servers. Additionally and/or optionally, network configuration information may be obtained from disk, memory, a communication link, user input, user configuration, command-line arguments, etc.

In some embodiments, besides the efficient network data transfer service, other services implemented by the database servers (102 and 104) may also use the message pipe (110) for inter-server communication purposes. Thus, in a particular embodiment where the message pipe (110) may be established on demand, not only can a request associated with the efficient network data transfer service cause the message pipe (110) to be established between the two database servers (102 and 104), but a communication request associated with a service other than the efficient network data transfer service also can cause the same message pipe (110) to be so established.

Negotiation (or Handshake)

In accordance with some embodiments of the present description, the efficient network data transfer service permits a database server (e.g., 102) to invoke access primitives supported by a different database server (e.g., 104) relative to a storage subsystem (e.g., 108) that is otherwise inaccessible to the former database server (i.e., 102).

In some embodiments, the database servers (102 and 104) may negotiate with each other for the purpose of identifying and/or selecting one or more commonly supported set of access primitives to be used in providing the efficient network data transfer service before such a service is made available to entities (such as 206 and/or 208) in the database servers (102 and 104). In a particular embodiment where a set of access primitives is associated with a release of database systems, a major version and/or a minor version of the release may be used to uniquely identify (or tag) the set of access primitives. In this embodiment, once one or more major versions and/o minor versions of the releases commonly supported by the database servers (102 and 104) are established (for example, through negotiation), the database servers may provide the efficient network data transfer services to entities (206, 208, etc.) in their respective database servers by invoking each other's access primitives in the commonly supported sets.

Figure 3:
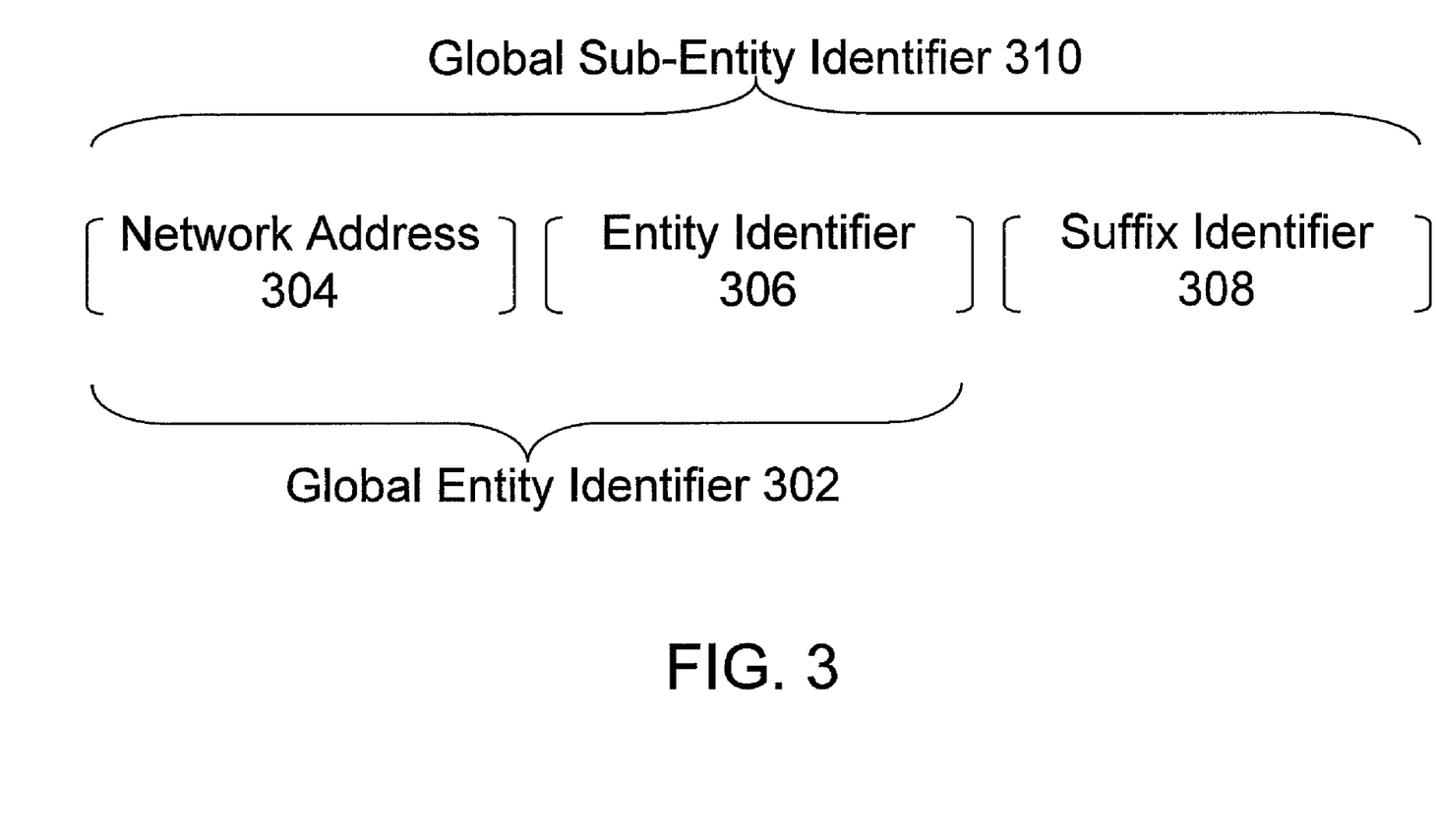
FIG. 3 is an example identifier for an entity in a database server, according to an embodiment of the present invention.

In some embodiments, in this negotiation, the database servers (102 and 104) may also identify to each other what storage subsystems (106 and/or 108) are attached to the database servers (102 and 104) that are not otherwise accessible to non-attached database servers. In a particular embodiment, identifying any storage subsystem of the database servers may be done using a globally unique identifier. As illustrated in FIG. 3, an example of such a globally unique identifier is a global entity identifier 302 that may comprise a network address 304 of a database server (e.g., 104) to which a storage subsystem (e.g., 108) is attached to and an end point address (or an entity identifier 306) identifying the storage subsystem (i.e., 108). Constructs (e.g., data blocks, extents, segments) within the storage subsystem may be further identified using appropriate suffix identifiers (such as 308 as illustrated in FIG. 3) appended to the globally unique identifier (302) of the storage subsystem (108), resulting in a global sub-entity identifier 310.

Example Time Sequence

Figure 4:
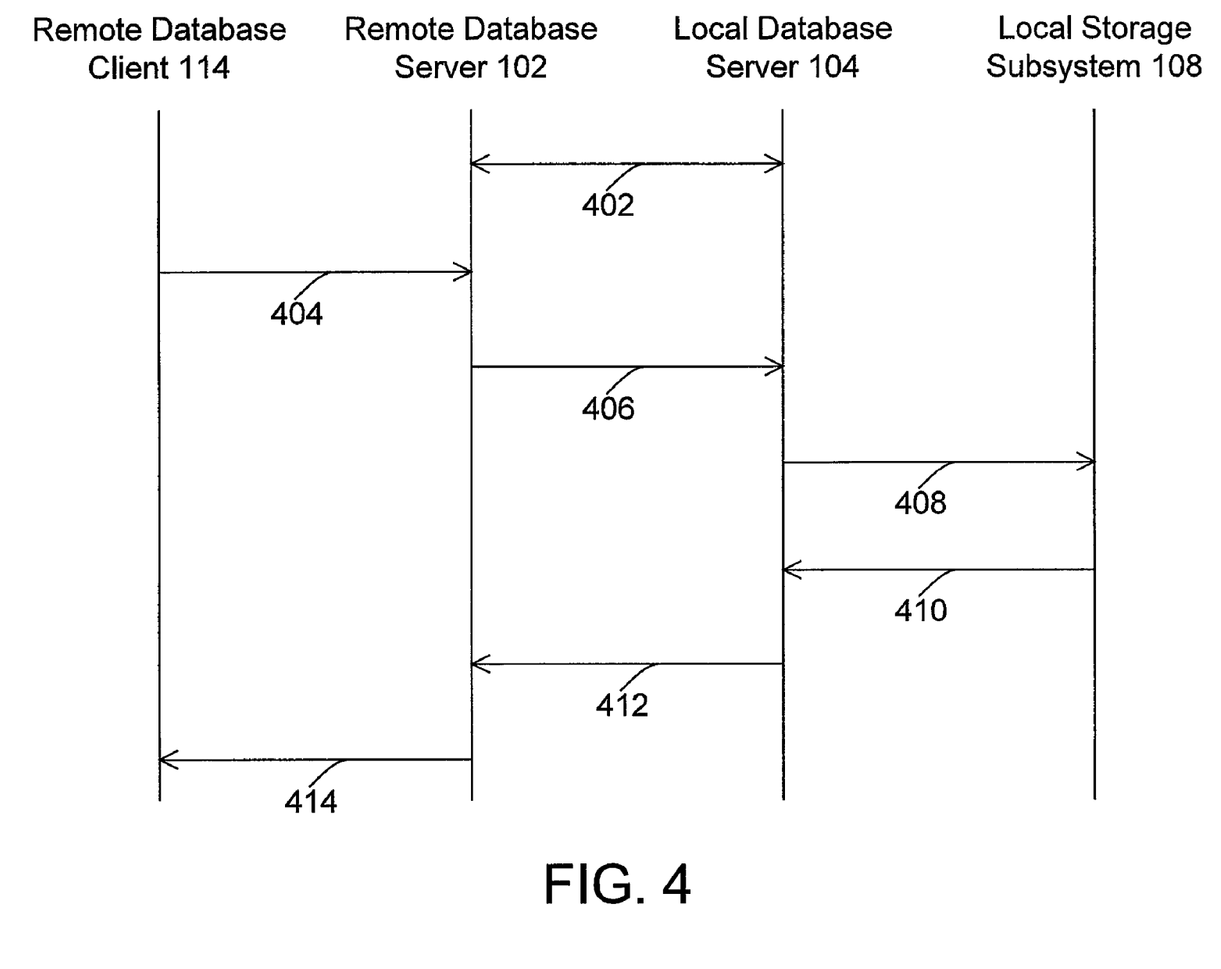
FIG. 4 is an example time sequence diagram in accordance with an embodiment of the present invention.

FIG. 4. illustrates an example time sequence during which the efficient network data transfer service may be provided to a database client, in accordance with an embodiment of the present description.

At a first time, in step 402, remote database server 102 and local database server 104 may engage in a negotiation, as previously described to exchange information sufficient to establish the service to at least database clients of at least one of the two database servers. For example, this negotiation allows the two database servers to agree upon one or more commonly supported sets of access primitives. In particular, one of the one or more commonly supported sets of access primitives may, for example, allow remote database server 102 (or an entity therein) to access objects in the local database server 104 or storage subsystems attached to the local database server 104. Such storage subsystems may include one (for example, 108 as illustrated in FIG. 1) that may not be otherwise accessible to any other database servers other than the local database server (104).

After the efficient network data transfer service is established between the database servers (102 and 104), in one embodiment, a database client may request database services from an associated database server that is one of the two database servers. As illustrated in FIG. 1, a remote database client 114 is associated with a remote database server 102. For example, the remote database client (114) may have established a database session the remote database server (102), thereby becoming associated with the remote database server (102). Such a remote database client (114) may request database services from the remote database server (102) by way of communicating with the remote database server (102).

While most of the requests from the remote database client can be satisfied by accessing data in the remote database server (102), some of the requests may involve accessing data or services in different database servers other than the remote database server (102). In particular, there may be a request from the remote database client (114) to access data in the otherwise non-accessible storage subsystem attached to a different database server such as the local storage subsystem (108) that is attached to the local database server (104), as illustrated in step 404 of FIG. 4.

Upon receiving such a request from the remote database client (114), the remote database server (102) translates user-supplied command, parameters and data in the request into data in native database format. Furthermore, the remote database server 102 may determine that the request must be satisfied by accessing data in the other database server (i.e., local database server 104). In particular, the remote database server 102 may, based on the information obtained during the negotiation for establishing the efficient network data transfer service as previously described, determine that the data to be accessed is located on local storage subsystem 108.

Using the data in native database format, in step 406 of FIG. 4, the remote database server (102) may invoke an appropriate access primitive that is supported by the local database server (104) to access the data stored on local storage subsystem 108. Invocation of such an access primitive may be in the form a request (message) sent from the remote database server (102) to the local database server (104). The request from the remote database server (102) may contain context information that carries data in native database format, including, but not limited to, the previously mentioned data that was translated from the user-supplied command, the parameters and the data in the request from the remote database client (114).

After receiving the request from the remote database server (102), the local database server (104) invokes the access primitive to access objects within the local database server (104) or storage subsystems that are attached to the local database server (104). In invoking the access primitive, the local database server (104) may supply the data that is already in native format that are specified in the request. Since both the access primitive and the data are natively supported at the local database server (104), there is no additional translation required to translate the access primitive and the data received from the remote database server (102).

For example, the access primitive in the request from the remote database server (102) may be one of several access primitives that provide access to the local storage subsystem (108). Likewise, the above-mentioned data in the native format may specify a location of where an interesting data block is stored in the local storage subsystem (108). As illustrated in FIG. 4, in step 408, such an access primitive may be invoked by the local database server (104) to access the interesting data block in the local storage subsystem (108).

The local storage subsystem (108) may be a directly attached device or a network attached system (NAS). As noted, in some embodiments, this local storage subsystem (108) is inaccessible to other database servers (which exclude the local database server). However, since the access primitive is invoked by the local database system, the access to data stored in the local storage subsystem (108) will be granted. As a result, the local storage subsystem (108) may indicate a grant of such an access to the local database server (102) in step 410.

Such an indication from the storage subsystem (108) may be forwarded to the remote database server (102) by the local database server (104). In an embodiment, the indication is forwarded by the local database server (104) without translation. Since this is an indication related to an access primitive supported by the remote database server (102), the database server may interpret the indication. In some embodiments, the remote database server (104) creates a response. In addition, the remote database server (104), after interpreting the indication from the local storage subsystem (108), translates any data returned with the indication into a format that may be understood by the remote database client (114) that issued the original request that caused access to the local storage subsystem (108). The translated data (in a client-understandable format) may be placed in the response by the remote database server (102). Thereafter, the remote database server (102) may send the response to the remote database client (114).

Repair of Corrupt Data Blocks

When a database system (such as local database server 104) encounters a logical or physical corrupt (data) block error, it usually results in a down database and unavailability of affected data until such data is repaired. The repair procedure itself is very expensive and is usually done by restoring a backup of the affected data (file) and by doing a database recovery on such affected data. Sometimes even when, logically speaking, only corrupt blocks should be recovered, other data may nevertheless become affected (therefore unavailable), resulting in a down database until the repair is complete.

In accordance with some embodiments of the present description, the efficient network data transfer service may be provided in a replicated database environment where multiple copies of data are stored in multiple locations (or database servers situated in these multiple locations). Using the efficient network data transfer service, corrupt data blocks in any copy of the data stored in one location can be repaired (near real time) while all database services of that location are being continuously kept online. By establishing a connection through a message pipe previously described with an unaffected database server (for example, remote database server 102) that holds the replicated data in an uncorrupt form, an affected database server (i.e., the one that contains the corrupt data blocks of the replicated data, for example, local database server 104) can send a special request to obtain uncorrupt data blocks from the unaffected database server. These data blocks could be in buffer cache (main memory) or a storage subsystem (for example, remote storage subsystem 106, which may be otherwise non-accessible to the affected database server, i.e., local database server 104, without the efficient network data transfer service) of the unaffected database server. By receiving a good version of the data blocks from the unaffected database server, the affected database server (the local database server) will be able to proceed without any downtime and without sacrificing any data availability.

Encryption and Compression

In some further embodiments, data transferred by the efficient network data transfer service may be encrypted (for example, by the sender) and decrypted (for example, by the receiver). Since data to be encrypted and decrypted is transported through a platform-independent but database-specific message pipe, there is no need to invoke external encryption and decryption processes (from operating systems, for example). As used herein, the term "database-specific" means that the message pipe may be implemented in a way specific to database systems used to implement the database servers.

Likewise, data transferred by the service may also be compressed (for example, by the sender) or decompressed (for example, by the receiver). As for encryption and decryption, compression and decompression may be performed without invoking any external compression and decompression processes (from operating systems, for example).

Various Example Embodiments

For the purpose of illustration, an access primitive has been described as being invoked after a database client such as the remote database client 114 has issued a request that causes database servers to access data in a storage subsystem such as the local storage subsystem (108). It should be noted that this is for illustration purposes only. For the purpose of this description, an access primitive does not have to be only invoked after such a request from a database client. The remote database server 102 may invoke one or more access primitives without being prompted by a request from a database client such as the remote database client 114. For example, between step 402 and 404, the remote database server 102 may invoke one or more access primitives to data stored in the local database server (including data stored in storage subsystems attached therewith). The invocation of these access primitives may provide, for example, schema information, system catalog information, etc. about the data stored in the local database servers. Thus, these and other variations of when an access primitive may be invoked are within the scope of the present description.

For the purpose of illustration, only one access primitive has been described as being invoked following a request from a database client. It should be noted that this is for illustration purposes only. For the purpose of this description, two or more access primitives may be invoked as a result of receiving a request from a database client. For example, the request from the remote database client 114 may need to be satisfied by an underlying join between two or more tables. This underlying join may be implemented by several access primitives. Thus, instead of a single access primitive being invoked, as illustrated in steps 406 through 412, multiple access primitives may be invoked. As a result, steps 406 through 412 may be repeated for two or more times. Thus, these and other variations in the number of access primitives invoked in response to a request from a database client are within the scope of the present description.

For the purpose of illustration, using access primitives to access an otherwise non-accessible storage subsystem has been described as using an access primitive to access data stored in the local storage subsystem (108). It should be noted that this is for illustration purposes only. Since the remote database server is also a database server, in some embodiments, the remote database server may be attached with one or more otherwise non-accessible storage subsystem such as the remote storage subsystem (106 of FIG. 1). Thus, in the negotiation between the database servers (102 and 104), the local database server (104) may determine that both database servers supports one or more sets of access primitives to access data stored in the remote storage subsystem (106). In some embodiments, the one or more sets of access primitives to access data stored in the remote storage subsystem (106) is the same as the one or more sets of access primitives to access data stored in the local storage subsystem (108).

In some embodiments, both the remote database server and the local database server offer an identical set of database services to their respective clients in accessing otherwise non-accessible storage subsystems. For example, just like the remote database server that offers such services to remote database clients to access the data in the local storage subsystem (108), the local database server may also offer such an identical set of services to local database clients to access the data in the remote storage subsystem (106). Therefore, steps similar to those depicted in FIG. 4 may be implemented to provide the network efficient data transfer service to the local database clients (118).

For the purpose of illustration, it has been described that one database client may send a request that invokes the efficient network data transfer service. It should be noted that this is for illustration purposes only. For the purpose of this description, there may also be two or more database clients that may substantially concurrently send requests that may invoke the efficient network database transfer service. For example, any of the remote database server and the local database server may have a number of foreground and background processes that database clients (114 and 118) may establish sessions and send requests. Moreover, these requests may be handled concurrently by the database servers.

For the purpose of illustration, an access primitive has been described as enabling a database server to access data stored in an otherwise non-accessible storage subsystem attached to another database server. It should be noted that this is for illustration purposes only. For the purpose of the present description, accessing data may include not only accessing existing data in the storage subsystem, but also creating data in the storage subsystem. Furthermore, accessing data may include, but is not limited to, deleting or modifying existing data in the storage subsystem. Accessing data may include, but is not limited to, accessing data in the otherwise non-accessible storage subsystem, as well in other memory or storage space of a database server to which the non-accessible storage subsystem is attached. Thus, these and other variations in meanings of accessing data in an otherwise non-accessible storage subsystem are within the scope of the present description.

Sample Operation

Figure 5:
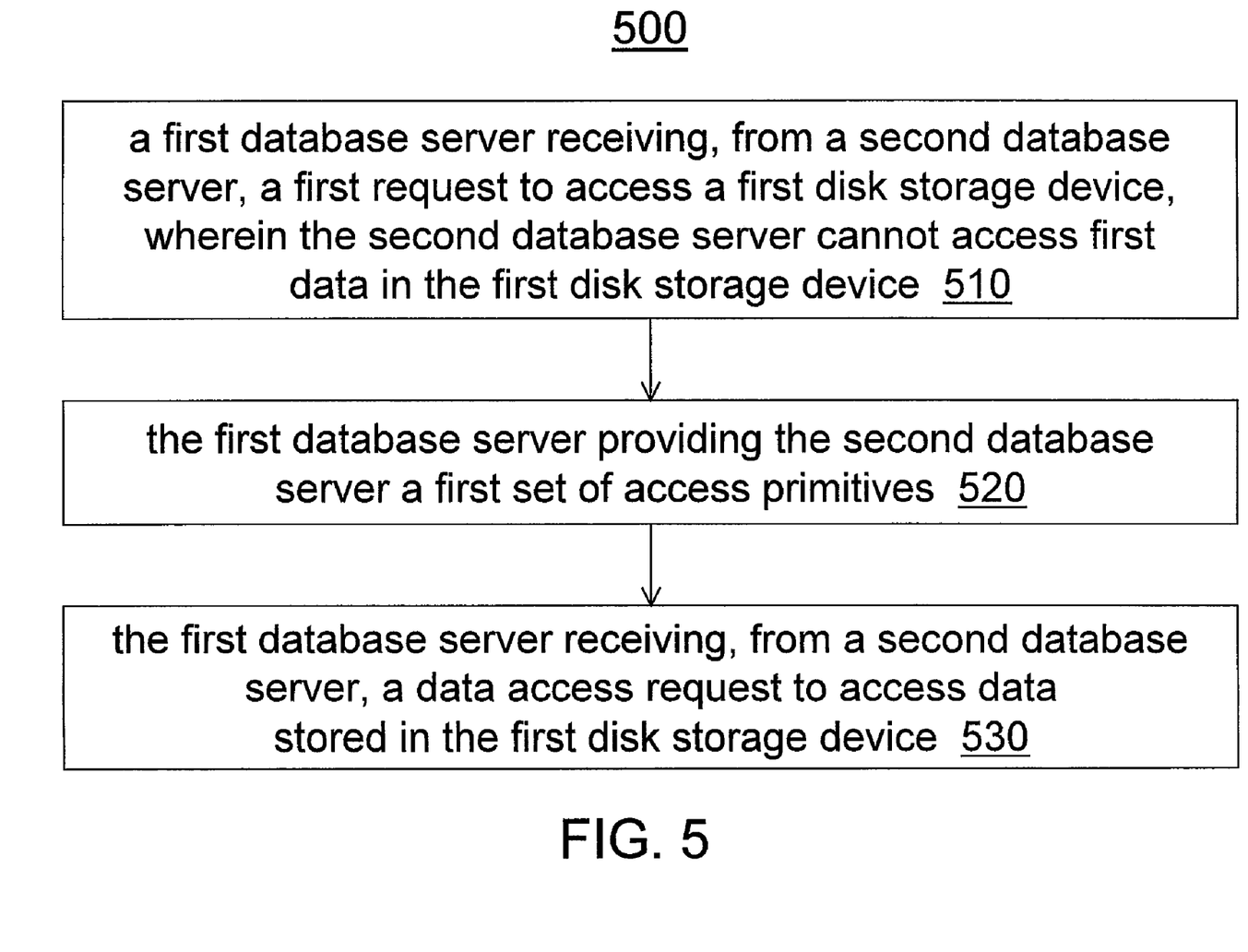
FIG. 5 is an example flow, according to an embodiment of the present invention.

FIG. 5 shows a process flow 500 which provides a high level overview of the methodology according to one embodiment of the invention. This process involves an interaction between a first database server (such as the local database server of FIG. 1) and a second database server (such as the remote database server of FIG. 1). In some embodiments, using a first set of access primitives, the first database server provides, to a first database client that is associated with the first database server, a first set of database services including accessing a first storage subsystem. Initially, the first database server receives, from the second database server, a first request to access the first storage subsystem (such as the local storage subsystem of FIG. 1) in block 510. Here, the second database server cannot access first data in the first storage subsystem without another database server (such as the first database server) transmitting the first data to the second database server.

Then, in response to receiving the first request, the first database server provides the second database server the first set of access primitives in block 520. Similar to the first database server, the second database server may provide, to a second database client that is associated with the second database server, a second set of database services including accessing the first storage subsystem. The first set of access primitives allows the second database server to provide, to the second database client that is associated with the second database server, services (in the second set of database services) that require accessing the first storage subsystem. In some embodiments, the second set of database services is identical to the first set of database services.

The second database server may receive a request from its database client to access first data in the first storage subsystem. Or the second database server may need to access the first data in the first storage subsystem on its own. In any case, the second database server may invoke an access primitive in the first set of access primitives by sending a first data access request with the access primitive specified therein. As a result, the first database server receives, from the second database server, the first data access request to access the first data stored in the first storage subsystem (block 530).

In some embodiments, using a second set of access primitives, the second database server provides, to a third database client that is associated with the second database server, a third set of database services including accessing a second storage subsystem. The second database server receives, from the first database server, a second request to access the second storage subsystem (such as the local storage subsystem of FIG. 1). Here, the first database server cannot access second data in the second storage subsystem without another database server (such as the second database server) transmitting the second data to the first database server.

Then, in response to receiving the second request, the second database server provides the first database server the second set of access primitives. Similar to the second database server, the first database server may provide, to a fourth database client that is associated with the first database server, a fourth set of database services including accessing the second storage subsystem. The second set of access primitives allows the first database server to provide, to the fourth database client that is associated with the first database server, services (in the fourth set of database services) that require accessing the second storage subsystem. In some embodiments, the fourth set of database services is identical to the third set of database services.

The first database server may receive a request from its database client to access second data in the second storage subsystem. Or the first database server may need to access the second data in the second storage subsystem on its own. In any case, the first database server may invoke an access primitive in the second set of access primitives by sending a second data access request with the access primitive specified therein. As a result, the second database server receives, from the first database server, the second data access request to access the second data stored in the second storage subsystem. In some embodiments, the fourth set of database services is identical to the third set of database services. In some embodiments, the first set of access primitive is identical to the second set of access primitives. Furthermore, even though the second set of database services and the third set of database services access different storage subsystems, i.e., the first and second storage subsystem, respectively, the two sets of database services are identical in terms of application programming interfaces that are offered to database clients. As a result, the database clients may access data in a locally attached storage subsystem in the same manner and semantics as they access data in a non-locally attached storage subsystem.

Likewise, in some embodiments, the first set of database services and the fourth set of database services are identical in terms of application programming interfaces.

In some embodiments, the first set of access primitives complies with a first specification that is different from a second specification with which the first set of database services complies. For example, the first set of access primitives used by database servers may use a database implementation specific specification (for example, specific to Oracle Database Systems, commercially available from Oracle Corporation, Redwood Shore, Calif.), while the first set of database service used by database clients may comply with a different specification (such as SQL, embedded SQL, dynamic SQL, etc.).

In some embodiments, the first client accesses the first set of database services using a first application programming interface that is identical to a second application programming interface used by the second client to access the second set of database services. In other words, the first client or the second client needs not be aware of whether data to be accessed is located in a locally attached storage subsystem or not.

As noted, without the efficient network data transfer service, the storage subsystems (106 and 108 of FIG. 1, for example) may not be otherwise accessible to database servers that are not directly attached to the storage subsystems. In some embodiments, this non-accessibility is caused by the fact that such storage subsystems are network storage subsystems that do not have any network link with database servers to which the storage subsystems are not directly attached.

Hardware Overview

Figure 6:
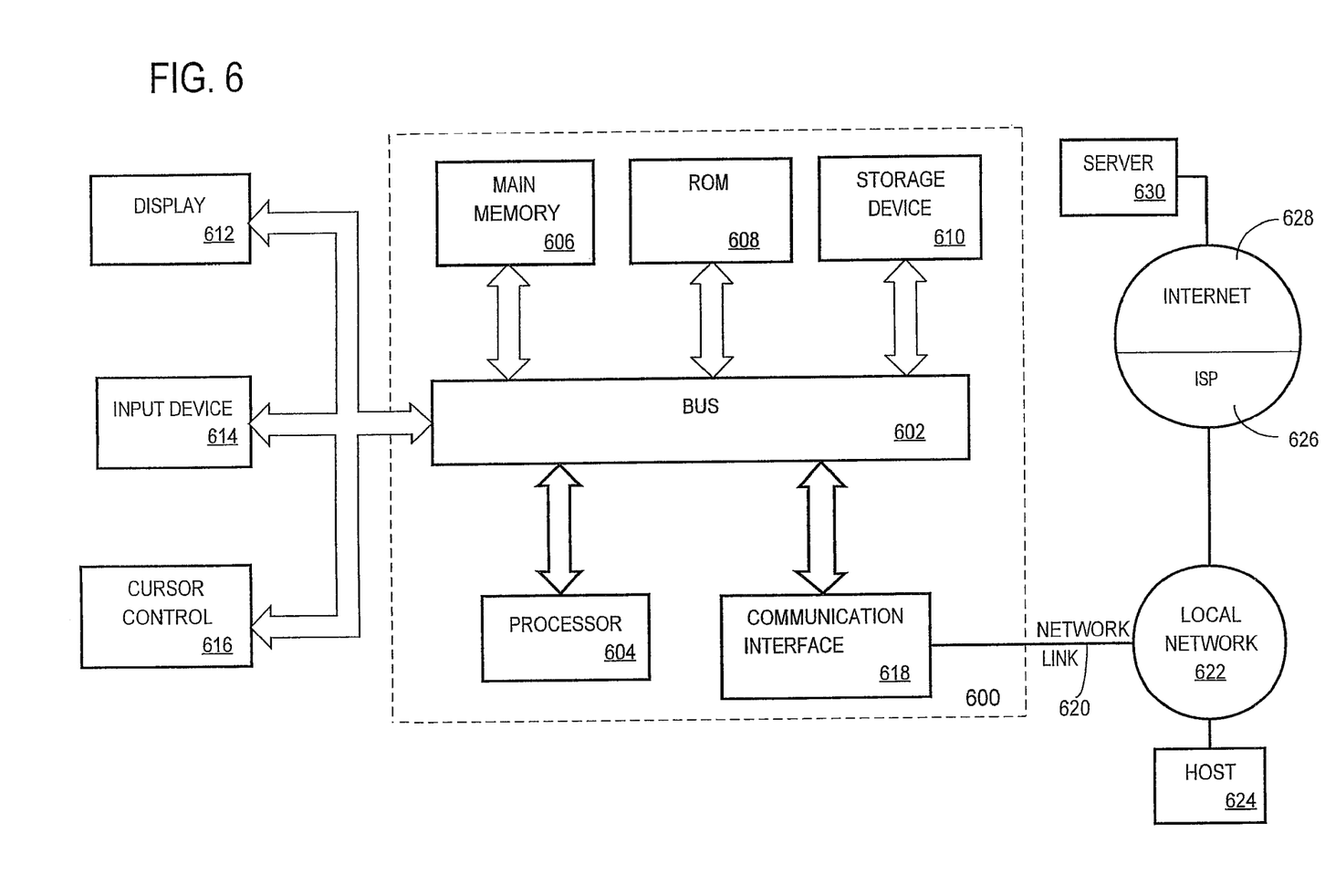
FIG. 6 is an example of a system upon which the techniques described herein may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for providing data access services relative to otherwise non-accessible storage subsystems, comprising:
    a first database server executing first query language statements that request access to first schema objects defined in a query language, wherein data for said first schema objects are stored in first non-schema objects in a first persistent storage subsystem, wherein said first database server executing said first query language statements includes using a first set of access primitives to access natively said first non-schema objects in said first persistent storage subsystem, and wherein said first set of access primitives provides direct access to said first non-schema objects;
    said first database server providing, to a second database server that is remote from said first database server, said first set of access primitives, wherein said second database server cannot access said data for said first schema objects stored in said first non-schema objects in said first persistent storage subsystem without said first database server retrieving and transmitting said data for said first schema objects to said second database server;
    said first database server receiving, from said second database server, at least one access primitive, in said first set of access primitives, in a message that requests access to at least one of said first non-schema objects;
    in response to receiving said at least one access primitive in said message, said first database server executing said at least one access primitive to access said at least one of said first non-schema objects in said first persistent storage subsystem and providing said at least one of said first non-schema objects as data for at least one of said first schema objects to said second database server;
    wherein the computer-implemented method is performed by one or more computing devices.

2. The method of claim 1, wherein said first database server provides, to a first database client that is associated with said first database server, a first set of database services including accessing said first persistent storage subsystem, wherein said first set of access primitives is used by said second database server to provide, to a second database client that is associated with said second database server, a second set of database services including accessing said first persistent storage subsystem, and wherein said second set of database services is identical to said first set of database services.

3. The method of claim 1, further comprising:
    said second database server executing second query language statements that request access to second schema objects defined in a query language, wherein data for said second schema objects are stored in second non-schema objects in a second persistent storage subsystem, wherein said second database server executing said second query language statements includes using a second set of access primitives to access natively said second non-schema objects in said second persistent storage subsystem, and wherein said second set of access primitives provides direct access to said second non-schema objects;
    said second database server providing, to said first database server, said second set of access primitives, wherein said first database server cannot access said data for said second schema objects stored in said second non-schema objects in said second persistent storage subsystem without said second database server retrieving and transmitting said data for said second schema objects to said first database server;
    said second database server receiving, from said first database server, at least one second access primitive, in said second set of access primitives, in a second message that requests access to at least one of said second non-schema objects;
    in response to receiving said at least one second access primitive in said second message, said second database server executing said at least one second access primitive to access said at least one of said second non-schema objects in said second persistent storage subsystem and providing said at least one of said second non-schema objects as data for at least one of said second schema objects to said first database server.

4. The method of claim 3, wherein said first set of access primitive is identical to said second set of access primitives.

5. The method of claim 3, wherein the first database server provides, to a first database client that is associated with the first database server, a first set of database services including accessing the first persistent storage subsystem, wherein the first set of access primitives is used by the second database server to provide, to a second database client that is associated with the second database server, a second set of database services including accessing the first persistent storage subsystem, and wherein the first set of database services is identical to the second set of database services in terms of application programming interface.

6. The method of claim 1, wherein said first persistent storage subsystem is a network storage subsystem that does not have any network link with said second database server.

7. The method of claim 1, wherein said first non-schema object is a data block in said first persistent storage subsystem.

8. The method of claim 1, wherein said first persistent storage subsystem is a network storage subsystem that does not have any network link with said second database server.

9. The method of claim 1, further comprising:
said second database server using one or more access primitives in said first set of access primitives to retrieve one or more first data blocks in said first persistent storage system from said first database server; and
said second database server repairing one or more second data blocks in a second persistent storage system accessible to said second database server.

10. The method of claim 1, wherein said first database server communicates with said second database server through a message pipe.

11. The method of claim 1, wherein said data for said at least one first schema object is encrypted while being transported through a message pipe between said first database server and said second database server.

12. A computer-readable storage media storing one or more sequences of instructions which, when executed by one or more processors, causes the one or more processors to perform:
a first database server executing first query language statements that request access to first schema objects defined in a query language, wherein data for said first schema objects are stored in first non-schema objects in a first persistent storage subsystem, wherein said first database server executing said first query language statements includes using a first set of access primitives to access natively said first non-schema objects in said first persistent storage subsystem, and wherein said first set of access primitives provides direct access to said first non-schema objects;
said first database server providing, to a second database server that is remote from said first database server, said first set of access primitives, wherein said second database server cannot access said data for said first schema objects stored in said first non-schema objects in said first persistent storage subsystem without said first database server retrieving and transmitting said data for said first schema objects to said second database server;
said first database server receiving, from said second database server, at least one access primitive, in said first set of access primitives, in a message that requests access to at least one of said first non-schema objects;
in response to receiving said at least one access primitive in said message, said first database server executing said at least one access primitive to access said at least one of said first non-schema objects in said first persistent storage subsystem and providing said at least one of said first non-schema objects as data for at least one of said first schema objects to said second database server.

13. The medium of claim 12, wherein said first database server provides, to a first database client that is associated with said first database server, a first set of database services including accessing said first persistent storage subsystem, wherein said first set of access primitives is used by said second database server to provide, to a second database client that is associated with said second database server, a second set of database services including accessing said first persistent storage subsystem, and wherein said second set of database services is identical to said first set of database services.

14. The medium of claim 12, wherein said one or more sequences of instructions further comprise instructions which, when executed by one or more processors, causes the one or more processors to perform:
said second database server executing second query language statements that request access to second schema objects defined in a query language, wherein data for said second schema objects are stored in second non-schema objects in a second persistent storage subsystem, wherein said second database server executing said second query language statements includes using a second set of access primitives to access natively said second non-schema objects in said second persistent storage subsystem, and wherein said second set of access primitives provides direct access to said second non-schema objects is enabled by said second set of access primitives;
said second database server providing, to said first database server, said second set of access primitives, wherein said first database server cannot access said data for said second schema objects stored in said second non-schema objects in said second persistent storage subsystem without said second database server retrieving and transmitting said data for said second schema objects to said first database server;
said second database server receiving, from said first database server, at least one second access primitive, in said second set of access primitives, in a second message that requests access to at least one of said second non-schema objects;
in response to receiving said at least one second access primitive in said second message, said second database server executing said at least one second access primitive to access said at least one of said second non-schema objects in said second persistent storage subsystem and providing said at least one of said second non-schema objects as data for at least one of said second schema objects to said first database server.

15. The medium of claim 14, wherein said first set of access primitive is identical to said second set of access primitives.

16. The medium of claim 14, wherein the first database server provides, to a first database client that is associated with the first database server, a first set of database services including accessing the first persistent storage subsystem, wherein the first set of access primitives is used by the second database server to provide, to a second database client that is associated with the second database server, a second set of database services including accessing the first persistent storage subsystem, and wherein the first set of database services is identical to the second set of database services in terms of application programming interface.

17. The medium of claim 12, wherein said first persistent storage subsystem is a network storage subsystem that does not have any network link with said second database server.

18. The medium of claim 12, wherein said first non-schema object is a data block in said first persistent storage subsystem.

19. The medium of claim 12, wherein said first persistent storage subsystem is a network storage subsystem that does not have any network link with said second database server.

20. The medium of claim 12, wherein said one or more sequences of instructions further comprise instructions which, when executed by one or more processors, causes the one or more processors to perform:

said second database server using one or more access primitives in said first set of access primitives to retrieve one or more first data blocks in said first persistent storage system from said first database server; and said second database server repairing one or more second data blocks in a second persistent storage system accessible to said second database server.

21. The medium of claim 12, wherein said first database server communicates with said second database server through a message pipe.

22. The medium of claim 12, wherein said data for said at least one first schema object is encrypted while being transported through a message pipe between said first database server and said second database server.

* * * * *

UNITED STATES PATENT AND TRADEMARK OFFICE
CERTIFICATE OF CORRECTION

| | | |
|---|---|---|
| PATENT NO. | : 8,032,548 B2 | |
| APPLICATION NO. | : 11/831809 | |
| DATED | : October 4, 2011 | |
| INVENTOR(S) | : Susairaj et al. | |

It is certified that error appears in the above-identified patent and that said Letters Patent is hereby corrected as shown below:

In column 18, line 21-22, in Claim 14, delete "objects is enabled by said second set of access primitives;" and insert -- objects; --, therefor.

Signed and Sealed this
Third Day of January, 2012

David J. Kappos
*Director of the United States Patent and Trademark Office*